United States Patent [19]

Christner et al.

[11] 4,136,800

[45] Jan. 30, 1979

[54] DISPENSED CONE COVERING AND METHOD OF VENDING

[75] Inventors: Willis D. Christner, Florence, Ky.; Howard J. Ortman, Cincinnati, Ohio

[73] Assignee: The Kroger Company, Cincinnati, Ohio

[21] Appl. No.: 825,149

[22] Filed: Aug. 16, 1977

[51] Int. Cl.² ...................... B65G 59/00; A21D 13/00

[52] U.S. Cl. ...................................... 221/1; 221/290; 221/113; 426/139; 426/101

[58] Field of Search ............... 221/209, 240, 290, 113, 221/1; 426/139, 101, 132; 206/505, 519

[56] References Cited

U.S. PATENT DOCUMENTS

| | | | |
|---|---|---|---|
| 2,228,942 | 1/1941 | Balton | 426/139 |
| 2,487,136 | 11/1949 | Heyman | 426/139 |
| 2,557,602 | 6/1951 | Huitt et al. | 426/139 X |
| 2,877,117 | 3/1959 | Heyman | 426/139 |
| 2,915,219 | 12/1959 | Salerno | 221/113 |

*Primary Examiner*—Allen N. Knowles

*Attorney, Agent, or Firm*—Cushman, Darby & Cushman

[57] ABSTRACT

An edible, stackable cone having a sanitary covering, and a method of vending such edible cones are provided. Each cone includes an inedible, non-toxic sanitary covering disposed over the bottom of the cone and extending upwardly at least a grasping distance, but terminating short of the open cone top. The covered cones are disposed in a nested stack, one above the other, and are automatically dispensed one at a time from the stack to a product-filling area. The covering may be a no-migration plastic, or food-grade paper, or aluminum foil, and the covering may be snugly - but readily removably - adhered to the cone by deforming selected areas of the covering into intimate contact with corresponding areas of the cone, or by providing an interference fit facilitated by ribbing.

16 Claims, 6 Drawing Figures

DISPENSED CONE COVERING AND METHOD OF VENDING

BACKGROUND AND SUMMARY OF THE INVENTION

U.S. Pat. No. 3,413,052 discloses a system that for the first time provides for practical automatic vending of ice cream cones and the like. The apparatus shown in U.S. Pat. No. 3,413,052 is capable of automatic vending of edible cones having edible product therein in a practical manner, however many accessory problems with respect to automatic vending remain. For instance, in the United States it is considered a potential health problem to have stacks of edible cones disposed within the machine for automatic vending since it is predicted to be possible for someone to reach up within the machine and touch a cone, or the cone can rub on unsanitary surfaces during dispensing.

Applicants have addressed the problem of providing sanitary conditions associated with the cones in an automatic vending machine, and have solved such problems while avoiding interference with the apparatus for automatically vending the cones, and while still dispensing the cones in a form so that they are still completely edible. According to the method of the present invention, a method is provided for vending edible open top cones adapted to receive edible product therein comprising the steps of covering a portion of each of a plurality of cones with an inedible non-toxic close-fitting sanitary covering and adhering the covering to the cone, the portion of each cone being covered comprising the bottom of the cone and extending upwardly therefrom a grasping distance and terminating short of the open top of the cone, disposing the cones in a nested stack, one above the other, and automatically dispensing the cones one at a time from the stack to a product-filling area. The term "edible product" as used in the present specification and claims covers ice cream, frozen yogurt, and like semi-solid foodstuffs that are conventionally served in edible cones. The term "grasping distance" as used in the present specification and claims refers to a significant distance up the periphery of the cone to allow grasping of that cone by an individual, however such a distance is not necessarily dimensioned to the extent shown and described in the present specification.

At the product-filling area the product is automatically dispensed into the cone. The step of covering a portion of the cone can be accomplished by disposing a covering around the cone comprising a no-migration plastic such as polyethylene, polypropylene, expanded polystyrene; food-grade paper, aluminum foil or a laminated structure combining together any of these materials. The covering may be made to snugly adhere to the cone so that it is not separated from the cone during normal handling of the cone stacks, and during automatic dispensing, as by deforming selected areas of the covering into intimate contact with corresponding areas of the cone. Although the covering snugly adheres to the cone, the covering is readily removed by the ultimate consumer so that the entire cone is edible. During eating of the cone by the consumer, however, the covering also serves the useful purpose of assisting the consumer in keeping his or her fingers clean during consumption.

Each of the cones may have a nesting ring formed thereon including a slanted surface, and the automatic one-at-a-time dispensing step may be accomplished by allowing the lowest cone in the stack to drop while camming the slanting surface portion of the nesting ring of the next-to-lowest cone in the stack by relative movement between the camming means and the stack, to support the rest of the stack besides the lowest cone to prevent dropping of the rest of the stack.

Also according to the present invention an edible, stackable cone adapted to receive edible product therein is provided comprising a generally flat bottom and a tapered portion extending upwardly from the bottom to a nesting ring, and an open top above the nesting ring. An inedible non-toxic sanitary covering covers the bottom and extends from the bottom upwardly toward the nesting ring covering at least a portion of the tapered portion, the covering extending upwardly from the bottom at least a grasping distance but terminating short of the cone open top. The nesting ring preferably includes means for engaging a camming surface to effect upward camming of the cone with respect to the camming surface, the means including a slanted portion of the nesting ring disposed at a positive angle alpha with respect to the horizontal, alpha being less than 90 degrees. Additionally the cone may be formed with bottom interior ribs extending upwardly from the bottom a distance H greater than the space inbetween the nesting ring and the open top, to provide clear access to the camming portions of the nesting rings by camming mechanisms associated with the automatic vending machine.

It is the primary object of the present invention to provide a method of automatic vending, and a product for automatic vending, that minimizes health problems and can obtain NSF approval. This and other objects of the invention will become clear from an inspection of the detailed description of the invention, and from the appended claims.

DETAILED DESCRIPTION OF THE INVENTION

Figure 1:
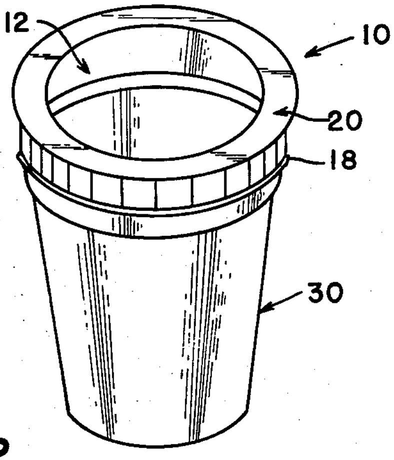
FIG. 1 is a perspective view of an exemplary edible stackable cone according to the invention.

A cone according to the present invention is shown generally at 10 in FIG. 1, the cone including an edible, stackable body portion 12. The cone preferably includes a generally flat bottom 14 and a tapered portion 16 extending upwardly from the bottom 14 to a nesting ring 18, and an open top 20 above the nesting ring 18. Formed in the interior of the cone at the bottom thereof are a plurality of reenforcing ribs 22. Preferably, the nesting ring 18 includes a slanted portion 24 which comprises means for engaging a camming surface to effect upward camming of the cone 12 with respect to a camming surface (58). The slanted portion 24 is disposed at a positive angle alpha with respect to the horizontal. The angle alpha is less than 90 degrees, and one preferred suitable angle alpha is about 38 degrees.

Figure 5:
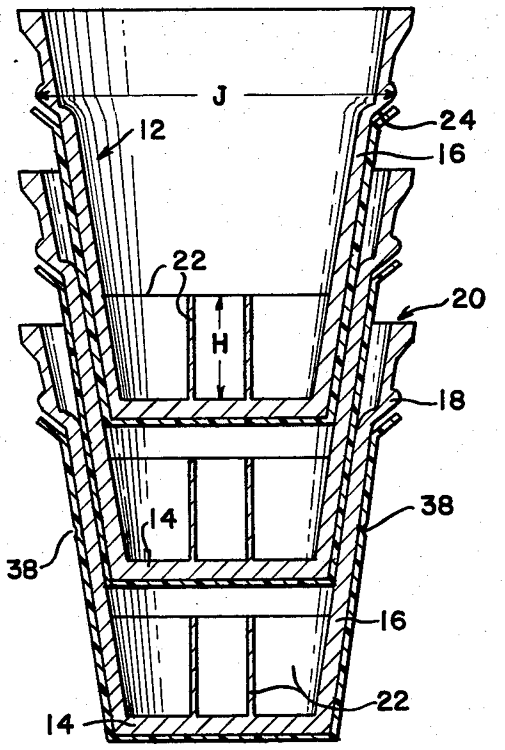
FIG. 5 is a cross-sectional view of a plurality of cones of FIG. 1 in a stack.

Although most of the dimensions of the cone 12 are not critical, one set of preferred, practical dimensions that may be provided is: A equal to the diameter of the bottom portion 14 equals about 1.45 inches; B equal to the height of the cone 12 equal to about 2.625 inches; C equals the distance from the termination of the slanted portion 24 of the ring 18 to the open top 20 of the cone is equal to 17/32 of an inch; distance E equal to the height of the ring from the bottom to the top of the slanted portion is equal to about 5/32 of an inch; distance D is equal to B minus C minus E equals about 1-15/16 inches; the diameter F of the cone at the open top 20 is equal to approximately 2.6 inches. The diameter J (see FIG. 5) of the nesting ring 18 is about 2.41 inches, and the height H of the ribs 22 is preferably greater than C + E, that is, greater than 11/16 inches. When the height H of the ribs 22 is greater than the distance C + E, a surface is provided within each cone 12 upon which the bottom 14 of an upper cone can rest while still ensuring that a spacing is provided between the slanted portion 24 of the upper cone from the open top 20 of the bottom cone, to allow access of a camming surface (58) to the slanted portion 24 without damage to the lower cone.

Figure 4:
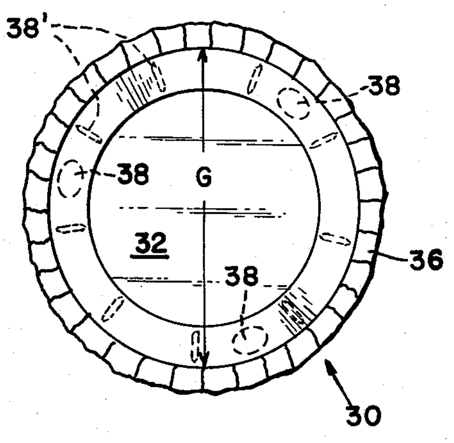
FIG. 4 is a top plan view of the covering of FIG. 3.
Figure 2:
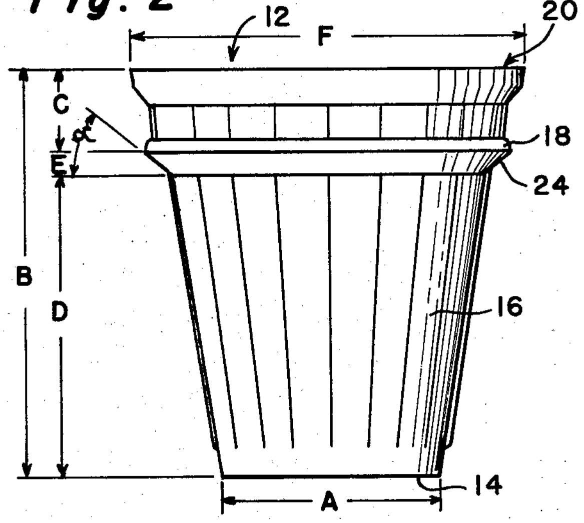
FIG. 2 is a side view of the cone to FIG. 1 before application of a sanitary covering thereto.
Figure 3:
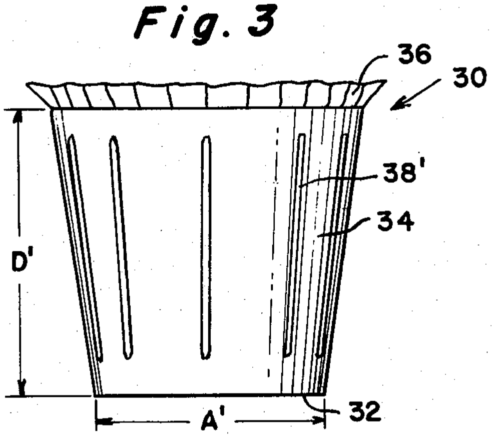
FIG. 3 is a side view of an exemplary sanitary covering sleeve that may be employed for covering the cone of FIG. 2.

The edible, stackable cone 10 according to the present invention also includes an inedible, non-toxic sanitary covering 30 (see FIGS. 1, 3 and 4) covering the bottom 14 of the cone 12 and extending from the bottom 14 upwardly toward the nesting ring 18, and covering at least a portion of the tapered portion 16. The covering 30 extends upwardly from the bottom 14 at least a grasping distance D′, but terminates short of the open cone top 20.

The covering 30 is preferably in the form of a sleeve (see FIGS. 3 and 4), including a bottom portion 32, tapered side portion 34, and a frilled, loose-fitting top ring 36. The dimension of the portions 32 and 34 of the covering 30 will be only slightly greater than the corresponding dimensions of the cone 12 with which the covering 30 is used; for instance the diameter A′ of the bottom portion 32 of the covering 30 is about 1.5 inches when the diameter A of the bottom portion 14 of a cone 12 with which it cooperates is about 1.485 inches. An exemplary height D′ of the tapered side portions 34 of the covering 30 would be 1⅞ inches, slightly less than the distance D of the corresponding cone. The frilled upper ring 36 prevents clear access to the nesting ring 18, however, it — especially in view of the loose nature thereof — does not interfere with a camming surface (58) that might act on the slanted portion 24 of the nesting ring 18 of the cone 12 with which it is associated, and additionally it provides a finger hold for grasping of the covering 30 for removal thereof.

The sleeve 30 is preferably snugly adhered to the cone 11, as by a tight-fitting interengagement between the parts, or other suitable fastening means. Preferred means for effecting snug adherence of the sleeve 30 to the cone 12 comprises a number of spaced points 38 that are deformed during assembly of the sleeve 30 with the cone 12 to deform portions of the sleeve into intimate contact with the cone; or a plurality of longitudinally extending ribs 38′ or the like, which facilitate the interengagement between cone 12 and sleeve 30. Although the fit is snug, the sleeve is readily removable by the ultimate consumer.

The covering 30 may be formed from a wide variety of inedible, non-toxic materials, such as food-grade paper, aluminum foil, no-migration plastics, or a laminate combining any of these materials. Suitable plastics include polyethylene, polypropylene, and expanded polystyrene. A suitable commercially available expanded polystyrene is Lustrex Q-668 manufactured by Monsanto, and another suitable polystyrene is Styron 470 manufactured by Dow.

According to the method of the present invention, a method of vnding edible open top cones 10 adapted to receive edible product therein is provided comprising the steps of covering a portion of each of a plurality of cones 12 within inedible non-toxic close-fitting sanitary covering (30) and adhering the covering to the cone, the portion of each cone 12 being covered comprising the bottom (14) of the cone and extending upwardly therefrom a grasping distance, and terminating short of the open top 20 of the cone; disposing the cones 10 in a nested stack (see FIG. 5), one above the other, and automatically dispensing the cones substantially one at a time from the stack to a product-filling area. The dispensed cones are then automatically filled at a product-filling area with product, such as ice cream, frozen yogurt, or the like. The covering can be applied to the cone in various ways, however one preferred way is by providing the covering as a sleeve and then adhering the sleeve to the cone as by deforming selected areas of the covering in intimate contact with corresponding areas of the cone to loosely adhere the covering to the cone.

Figure 6:
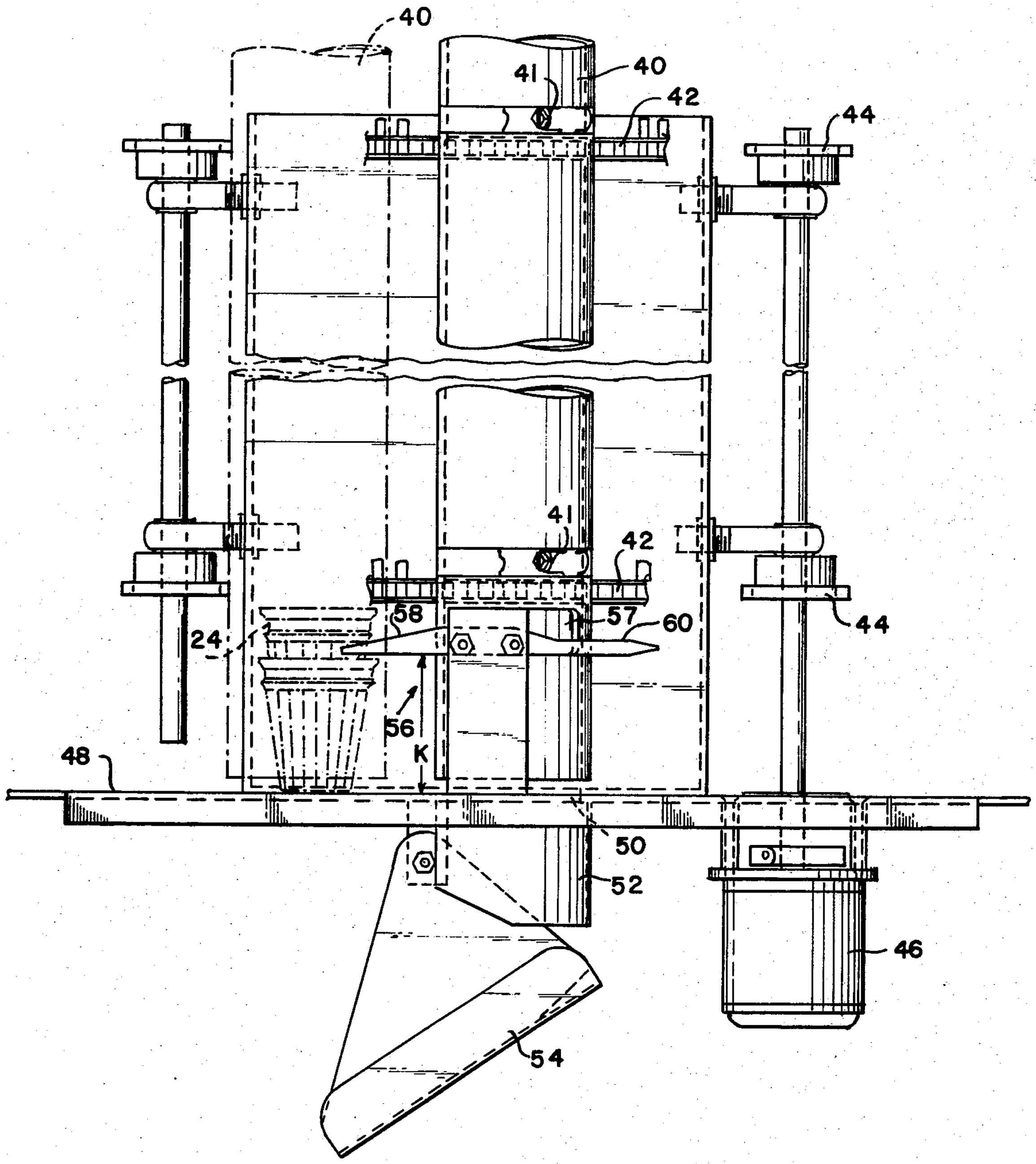
FIG. 6 is a side view illustrating apparatus used for vending cones automatically according to the method of the present invention.

A typical method, and means for accomplishing the method, of automatically dispensing cones is shown in FIG. 6. A plurality of generally vertically upstanding clear plastic tubes 40 or the like are provided, connected by suitable means such as metallic bands 41 to suitable drive structures such as chains 42 driven by gears 44 and a motor 46. A stack of cones 10 is provided in each one of the tubes 40, and as the tubes 40 are revolved under power of the motor 46, the bottom cone in each stack engages the top of the plate 48 and slides therealong. An opening 50 is provided in the plate 48 in the path of the cylinders 40, with a guide tubular portion 52 extending downwardly from the plate 48 around the opening 50, and a cone guide chute 54 is disposed in operative relationship with the tube portion 52 to guide the path of a cone that drops through the opening 50 and to portion 52 to a product-filling area below the bottom termination of the chute 54. Preferably the chut 54 terminates just above a mechanical grasping arm such as shown in U.S. Pat. No. 3,413,052, which then moves the cone underneath an automatic product-dispensing nozzle, to be filled, and then moves the cone to a dispensing area.

The cones are dispensed one at a time by the structure of FIG. 6 by the camming means 56. The camming means 56 includes two cam surfaces 58 disposed on either side of the pathway of the tubes 40, each tube 40 having a slit 57 formed therein to allow penetration of the camming surface 58 thereinto. The camming surface 58 is disposed a distance K above the plate 48, the distance K being greater than the distance B (even including the thickness of the bottom 32 of the covering 30), but being less than — at least at the leading edge thereof — the height of the slanted portion 24 of the second cone in the stack. The relative movement of the cones in the stack in a tube 40 with respect to the camming surface 58 results in the camming surface 58 engaging the slanting portion 24 of the next-to-the-lowest cone in the stack and raising that cone (and the cones in the stack disposed thereabove) upwardly slightly and supporting it in the vertical direction while the lowest cone in the stack drops through the opening 50 in plate 48, and subsequently is guided by the chute 54 toward the dispensing arm or the like as shown in U.S. Pat. No. 3,413,052. As the tube 40 continues relative movement with respect to the means 56, the formerly next-to-lowest cone in the stack — which is now the lowest cone in the stack — engages the lowering surface 60 (or rather the slanted portion 24 thereof engages the surface 60), to ultimately lower the lowest cone in the stack into engagement with the top of the plate 48. The cones in the next stack in the next tube 40 are simultaneously brought into operative engagement with the means 56 so that automatic one-at-a-time dispensing of the cones is continuous. Of course other suitable automatic dispensing arrangements may be provided within the scope of the method according to the invention.

While the steps of covering the cone 12 with the inedible covering 30 can be accomplished in a wide number of ways, one preferred way of accomplishing the same is to separately form the cone 12 and a sleeve 30, slide the cone 12 into the covering 30, apply pressure at selected points around the circumference of the portion 34 of the covering 30 to deform selected areas 38 of the covering 30 into intimate contact with corresponding areas of the cone to loosely adhere the covering to the cone, and then manually disposing the cones in the stack. The adhering step according to the invention effects adherence only to the extent that the covering will not become readily separated from the cone during automatic dispensing thereof, and it is preferred that while the covering adhere snugly to the cone, it may be readily removed by the ultimate consumer (as by grasping fringed collar 36 and pulling down on the covering 30 with respect to the cone 12) so that the whole cone 12 may be eaten.

The automatic vending of cones according to the method of the present invention, meets NSF approval for sanitation, and the cones according to the present invention are so approved for automatic vending. Thus, the objects according to the present invention are accomplished.

While the invention has been herein shown and described in what is presently conceived to be the most practical and preferred embodiment thereof, it will be apparent to those of ordinary skill in the art that many modifications may be made thereof within the scope of the invention, which scope is to be accorded the broadest interpretation of the appended claims so as to encompass all equivalent products and methods.

What is claimed is:

1. A method of vending edible open top cones adapted to receive edible product therein comprising the steps of (a) covering a portion of each of a plurality of cones with an inedible, non-toxic, close-fitting sanitary covering, (b) adhering the covering to the cone, the portion of each cone being covered comprising the bottom of the cone and extending upwardly therefrom a grasping distance, and terminating short of the open top of the cone, said adhering accomplished by providing a plurality of generally longitudinally extending ribs in said covering, said ribs facilitating interfering engagement between said covering and said cone portion, (c) disposing said cones in a nested stack, one above the other, and (d) automatically dispensing said cones substantially one at a time from said stack to a product-filling area.

2. A method as recited in claim 1 comprising the further step of automatically filling a dispensed cone at said product-filling area with product.

3. A method as recited in claim 1 wherein said step of covering a portion of each of a plurality of cones with an inedible, non-toxic, close-fitting sanitary covering is accomplished by disposing a covering around said cone portion selected from the group consisting of no-migration polyethyle, polypropylene, and expanded polystyrene, aluminum foil, food-grade paper in a laminated structure combining together any of these materials.

4. A method as recited in claim 1 wherein said step of covering a portion of each of a plurality of cones with an inedible, non-toxic, close-fitting sanitary covering is accomplished by disposing a covering food-grade paper around said cone portion.

5. A method as recited in claim 1 wherein said adhering step is accomplished by snugly, but readily removably, adhering said covering to said cone so that after dispensing of said cone said covering may be readily removed.

6. A method as recited in claim 1 wherein each of said cones has a nesting ring formed thereon including a slanted surface portion, and wherein said automatic one-at-a-time dispensing step is accomplished by allowing the lowest cone in said stack to drop while camming the slanting surface portion of the nesting ring of the next-to-lowest cone in said stack by relative movement between a camming means and said stack, to support the rest of said stack besides said lowest cone to prevent dropping of the rest of said stack.

7. A method as recited in claim 1 wherein said covering step is accomplished by forming a sleeve of inedible, non-toxic material having interior dimensions the same as or slightly greater than the exterior dimensions of said cone portion being covered, and placing said sleeve over said cone portion.

8. A method as recited in claim 7 wherein said sleeve is formed of a material selected from the group consisting of no-migration polypropylene, polyethylene, and expanded polystyrene.

9. A method as recited in claim 7 wherein said sleeve is formed of a material selected from the group consisting of aluminum foil, food-grade paper, and laminates.

10. A method as recited in claim 1 wherein said covering comprises a sleeve formed of a material selected from the group consisting of no-migration polypropylene, polyethylene, expanded polystyrene, aluminum foil, food-grade paper, and laminates.

11. An edible stackable cone adapted to receive edible product therein, comprising (a) a generally flat bottom, and a tapered portion extending upwardly from said bottom to a nesting ring, and an open top above said nesting ring, (b) an inedible, non-toxic sanitary covering covering said bottom and extending from said bottom upwardly toward said nesting ring, and covering at least a portion of said tapered portion, said covering extending upwardly from said bottom at least a grasping distance but terminating short of said cone open top, and (c) means for effecting a snug adherence of said sleeve to said cone, yet providing ready removal of said entire sleeve from said cone by an ultimate consumer, said means comprising a plurality of generally longitudinally extending ribs in said covering, said ribs facilitating interfering engagement between said covering and said cone.

12. A cone as recited in claim 11 wherein said nesting ring includes means for engaging a camming surface to effect upward camming of said cone with respect to said camming surface, said means including a slanted portion of said nesting ring disposed at a positive angle $\alpha$ with respect to the horizontal, $\alpha$ less than 90°.

13. A cone as recited in claim 11 further comprising ribs formed in the bottom interior of said cone and extending upwardly from said bottom a distance H greater than the spacing between said nesting ring and said open top.

14. A cone as recited in claim 11 wherein said sleeve material is selected from the group consisting of no-migration polyethylene, expanded polystyrene, and polypropylene.

15. A cone as recited in claim 11 wherein said sleeve is formed of a material selected from the group consisting of aluminum foil, food-grade paper, and laminates.

16. A method of vending edible open top cones adapted to receive edible product therein comprising the steps of (a) covering a portion of each of a plurality of cones with an inedible, non-toxic, close fitting sanitary covering, each of said cones having a nesting ring formed thereon including a slanted surface portion, and each sanitary covering having a frilled loose fitting upper ring, (b) adhering the covering to the cone, the portion of each cone being covered comprising the bottom of the cone and extending upwardly therefrom a grasping distance, and terminating generally at the cone's slanted surface portion, the frilled loose fitting upper ring being generally disposed around the slanted surface portion of the nesting ring, (c) disposing said cones in a nested stack, one above the other, and (d) automatically dispensing said cone substantially one at a time from said stack to a product filling area by allowing the lowest cone in said stack to drop while camming the slanting surface portion of the nesting ring of the next to lowest cone in said stack by relative movement between a camming means and said stack, to support the rest of the stack besides said lowest cone to prevent dropping of the rest of said stack, said covering frilled upper ring not interfering with the camming means.

* * * * *